United States Patent

[11] 3,583,728

[72] Inventors Allen A. Cornell
6 Barkeston Court, Shrubbery Road, London, S.W. 16;
David C. Taube, 1 Acorn Gardens, Upper Norwood, London, S. E. 19, both of, England
[21] Appl. No. 822,235
[22] Filed May 6, 1969
[45] Patented June 8, 1971
[32] Priority May 6, 1968
[33] Great Britain
[31] 21360/68

[54] TRAILER HITCHES
11 Claims, 6 Drawing Figs.

[52] U.S. Cl. ................................................. 280/503
[51] Int. Cl. ................................................. B60d 1/00
[50] Field of Search .......................................... 280/503, 493, 494, 495, 459

[56] References Cited
UNITED STATES PATENTS
1,572,914  2/1926  Fleming........................ 280/503
2,056,523  10/1936  Jacob............................ 280/503
3,129,019  4/1964  Bartone......................... 280/503

Primary Examiner—Keneth H. Betts
Assistant Examiner—Robert R. Song
Attorney—Holcombe, Wetherill & Brisebois ABSTRACT: A trailer hitch comprising a "Y"-shaped frame which accommodates the operational rotational movements by means of relative rotary capability between the arms of a "Y"-shaped frame and its foot and also between bearings adapted for attachment to the rear wheel hubs of the towing vehicle and the terminal portions of the arms of the frame. These rotary movements permit the use of standard antifriction bearings to couple the arms of the frame to the rear wheel hubs of a towing vehicle.

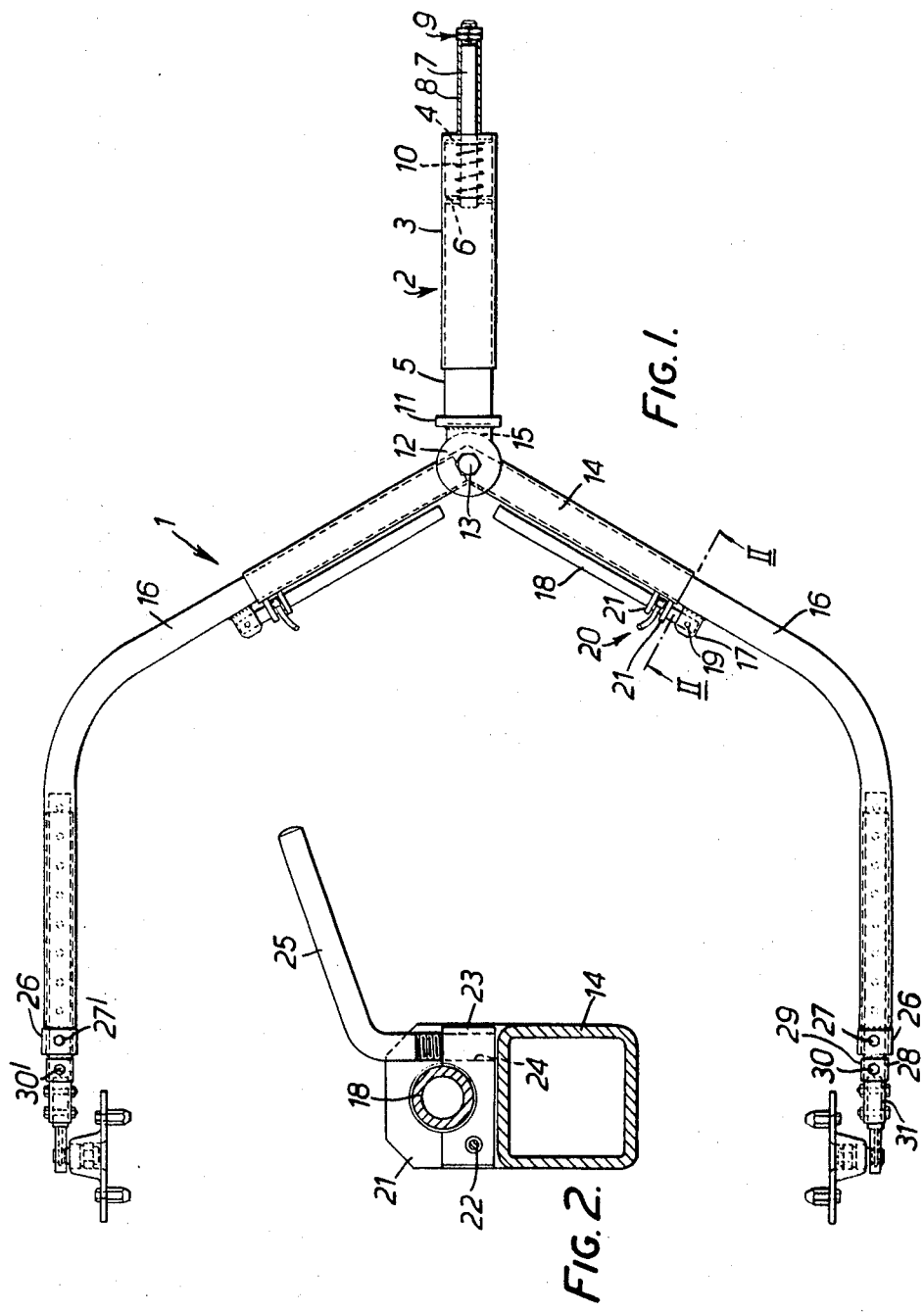

INVENTOR
A. A. CORNELL
BY D. C. TAUBE
Holcombe, Wetherill + Brisebois
ATTORNEYS

TRAILER HITCHES

This invention relates to trailer hitches.

In normal practice a trailer is attached to its towing vehicle by way of a towing bracket firmly secured to the rear of the towing vehicle body or chassis. Where a vehicle is only infrequently used for towing, then the installation of a towing bracket is a relatively costly operation in comparison with the limited use made of it.

According to the present invention a trailer hitch comprises a symmetrical substantially "Y"-shaped frame having parallel terminal arm portions carrying bearings for attachment to the rear wheel hubs of a towing vehicle, the foot of the "Y" being arranged for attachment to a trailer, pivotal connections being provided between the various parts of the hitch to permit rotation:

a. of the arms of the "Y" as a unit relative to the foot, about an axis parallel to the foot, b. of the arms of the "Y" as a unit relative to the foot, about an axis passing through the junction of the arms normal to the frame, and c. of each bearing arcuately about the longitudinal axis of the corresponding terminal arm portion.

The foot portion of the frame may consist of a pair of telescopically arranged tubular members, the outer of which is adapted to be secured to the trailer, and which are adapted to provide a straight-through connection when in their fully extended position. A shock absorber may be provided to damp the telescoping movement between the two tubular members, and the relative axial movement between the tubular members may be used to operate an overrun braking device on the trailer.

For convenience, the arms of the "Y" may diverge from each other at an obtuse angle and terminate in portions extending parallel to each other. Both the inclined portions and the parallel portions of the arms may be provided with length-adjustment to correspond to different widths and lengths of towing vehicle respectively, and the terminal end portions may be cranked to give adequate clearance around the body work of a towing vehicle adjacent the rear wheels thereof.

Conveniently, the terminal portion of each arm is hollow, and carries a bearing-engaging clamp which includes a rod engaging in the hollow end of the arm and secured therein in a manner which prevents axial movement but allows sufficient rotational movement to permit operational arcuate rotation of the bearing around the axis of the terminal portion of the arm.

Preferably, each bearing includes a slotted plate for attachment to the hub of the corresponding rear wheel of the towing vehicle by means of the normal securing members of the latter.

The invention will now be described in greater detail with reference to one exemplary embodiment which is illustrated in the accompanying drawings, of which:

FIG. 1 is a plan view of the specific embodiment of the invention with certain internal parts shown in dotted lines;

FIG. 2 is a section taken on the line II—II of FIG. 1 illustrating a clamping member;

Figure 3:
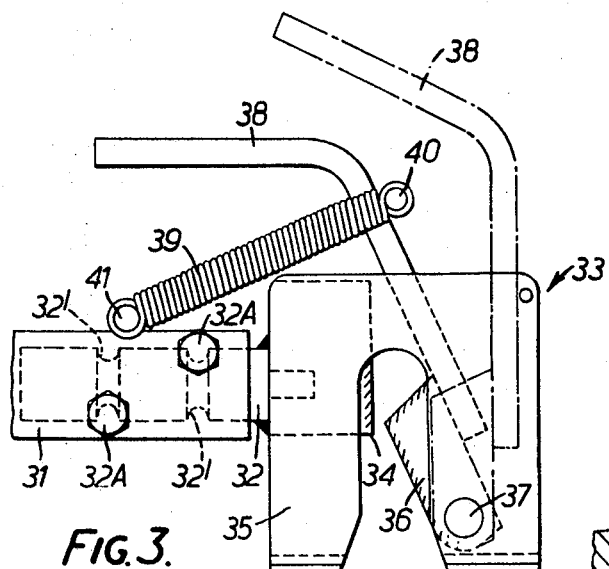
FIG. 3 is a side elevation of a bearing-engaging clamp as used in FIG. 1.

Referring first of all to FIG. 1 of the drawings, the trailer hitch illustrated is generally "Y"-shaped and consists of a pair of arms generally indicated at 1, and a foot portion generally indicated at 2. The foot portion comprises an outer cylindrical tube 3 adapted to be secured to the trailer. The outer tube 3 is closed at its end by a centrally apertured plate 4 and disposed around an inner cylindrical tube 5. One end of the tube 5 is closed at 6, and a rod 7 secured to this closure passes through the central aperture in the plate 4. A rigid tubular sleeve 8 slidably encircles the portion of the rod 7 extending beyond the plate 4 and is retained by means of a pair of nuts indicated at 9. A compression spring 10 is located around the rod 7 between the closure 6 and the plate 4. The other end of the tube 5 is welded to a plate 11, and this plate in turn carries a pair of lugs 12, one of which can be seen in FIG. 1, to accommodate a pivot bolt 13 which secures the foot 2 to the arms 1.

The arms of the hitch meet at a two-armed, hollow tubular member 14 constructed from square-section steel tube. The two arms of the member 14 diverge at an angle of 120°. The junction of the two arms of the member 14 is provided with circular discs 15 which are welded on to abut the inner faces of the lugs 12. The pivot bolt 13 secures the member 14 to the foot portion 2 of the hitch in such a manner as to permit rotation of the arms of the "Y" as a unit relative to the foot about an axis passing through the junction of the arms normal to the hitch.

Each end of the member 14 accommodates a further frame member 16, similarly of hollow, square-section steel tube, so shaped that the outer ends of the two members 16 extend symmetrically with respect to the member 14 and parallel to each other. Locking of the members 16 with relation to the member 14 is effected by means of the clamping arrangement which is seen in FIG. 1 and which is illustrated in greater detail in FIG. 2. Each member 16 carries a pair of upstanding lugs 17 which support a corresponding length of rigid tube 18 on a transverse pivot pin 19. The member 14 carries a corresponding pair of clamping members generally indicated at 20. Each clamping member consists of a pair of upstanding lugs 21 which are bored to accommodate the tube 18. A pivot 22 carried by the lugs 21 supports a locking cam 23 which is provided with a threaded bore 24 accommodating a clamping screw 25. It will be seen from FIG. 2 that tightening of the clamping screw 25 forces the cam 23 into firm engagement with the tube 18, thereby clamping the latter. The free end of each member 16 is provided with a thickened collar 26, and a bore 27 extends clear through the tubular member 16 and collar 26. A first extension member 28, of square-section steel tube, is accommodated telescopically within the end of each of the members 16, and is bored at 2 inch intervals along its length to permit of its being adjusted longitudinally of the free end of the corresponding member 16, and locked in position by means of a bolt 27'. Similarly, the free end of each member 28 has a thickened collar 29 bored at 30 and a corresponding second extension piece 31 nests within the member 28. This extension piece 31 is again of hollow square-section steel tube. Also, a bolt 30' is provided to lock the extension piece 31 within the extension piece 28.

A short length of circular-section steel tube (not shown) is welded within the open end of each extension piece 31, and this accommodates a cylindrical spindle 32 of a bearing engaging clamp generally indicated at 33. The spindle 32 carries a rectangular plate 34 and a pair of slotted cheek plates 35 are welded on either side of the plate 34. A locking member 36 of platelike form is supported between the cheek plates 35 on a pivot 37 and carries an operating lever 38 by means of which it can be moved from the solid line position to the dotted line position of FIG. 3 against the tension of a pair of springs 39 which engage on the ends of a pair of corresponding pins 40 and 41 welded to the lever 38 and the extension piece 31 respectively. It will be seen from FIG. 3 that the spindle 32 carries a pair of axially spaced grooves 32' which are engaged by bolts 32A passing through the extension piece 31.

Each bearing engaging clamp 33 is constructed to engage with a corresponding stub axle 42 carried in roller bearings 43 at the center of a slotted bearing plate 44. The stub axle is retained in engagement by means of a nut 45. The end of the stub axle engaged by the clamp 33 is formed with a shoulder 46 and a grooved cylindrical end portion 47. The engagement is such that the plate 34 and locking member 36 of the clamp 33 engage in the groove 47A of the portion 47, while the cheek plates engage on the cylindrical regions of the portion 47. To assist in engagement in the groove 47A the corresponding edges of the plate 34 and locking member 36 are chamfered as indicated by the shading in FIG. 3.

Figure 5:
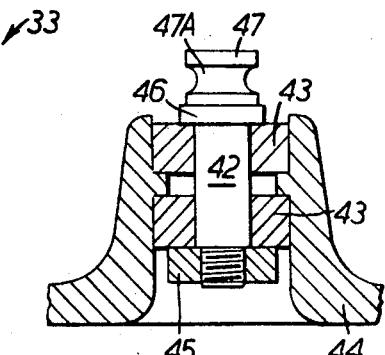
FIG. 5 is a fragmentary sectional view taken diametrically through the center of the bearing plate of FIG. 4 and illustrating the method of securing and supporting a stub axle.
Figure 4:
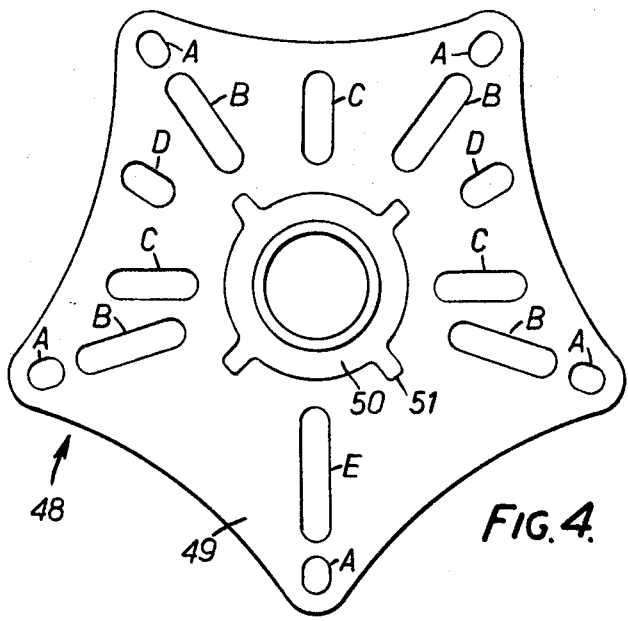
FIG. 4 is a plan view of a slotted bearing plate as used in the embodiment of FIG. 1.

Each bearing plate consists of a web 49 and a hub portion 50 provided with strengthening ribs 51. The web 49 is approximately pentagonal in plan view and is slotted with a series of slots which are labeled in FIG. 4 in sets A, B, C, D and E. The apertures of the first series A are spaced apart from each other by 72° and are intended for coupling to a towing vehicle wheel hub having five wheel securing studs. The single slot E cooperates with the slots of the set B to form a second group for use with five-stud hubs, with the slots of set C for use with four-stud hubs, and with the slots of the set D for use with three-stud hubs. Within limits, the slots E and D can also be used in conjunction with six-stud wheel hubs, making use only of three of the studs for securing the bearing plate 48. The bearing plate is secured to the corresponding hub of a towing vehicle by removal of the retaining nuts from the hub, replacement of the removed nuts by extension nuts of the type illustrated in FIG. 6 to secure the vehicle wheel on to its hub, and then the appropriate slots of the bearing plate are applied over the projecting shanks of the extension nuts. Nuts threaded to correspond to the shanks of the extension nuts are then used to secure the bearing plate to the hub of the towing vehicle. As indicated above, in the case of a six-stud wheel, three only of the nuts are removed and replaced by the extension nuts, the remaining three original nuts being left in position. The three extension nuts are then engaged with the apertures E and D. It has been found that the pattern of slots illustrated in FIG. 5 allows fitting of the bearing plate to the majority of vehicles in use on British roads, without undue loss of strength of the bearing plate such as would occur if multiple drilling were to be used to provide the necessary stud combinations.

Figure 6:
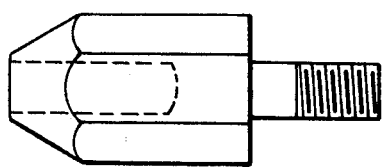
FIG. 6 is a side elevation of an extension piece used for securing the plate of FIGS. 4 and 5 of the hub of a wheel of a towing vehicle.

Should a vehicle be equipped with wheel fixing bolts rather than nuts and studs, then the bearing plate can still be used, but instead of the extension members illustrated in FIG. 6, it will be necessary to provide extension members having threaded shanks at both ends. Then, the wheel-retaining bolts are replaced by screwing one end of each extension into the relevant threaded aperture in the hub, while the plate is then located over the projecting threaded shanks of the extension members, and a set of matching nuts is used to secure the plate to the extension members. It will be appreciated that the width of the slots in the bearing plate may be kept to a minimum by using a standard size stud and nut, thus avoiding the necessity for machining excessively wide slots to accommodate the thickness of stud used to secure the wheel of the towing vehicle to its hub. It is for this reason that provision is not made to use the securing nuts or bolts of the towing vehicle wheels to secure the bearing plates to the extension members.

It will be readily appreciated without further detailed description that the trailer hitch illustrated above may be adapted for use with many different types of vehicle by adjustment of the lengths and widths of the arms, and by provision of a suitable set of extension members. It is found, moreover, that the pivotal movements provided in the hitch will accommodate all the necessary relative movement between the towing vehicle and the trailer. Relative rotation of the two tubular parts 3 and 5 will accommodate corresponding rotation of the trailer and towing vehicle about a longitudinal axis as a result of road unevenness, rotation about the bolt 13 accommodates steering movement, while the rotation of the bearing plates about the axes of the spindles 32 accommodates the oscillation of certain types of rear wheel suspension encountered in motor vehicles. One such example of this is the swinging arm, or DeDion type suspension. The case of trailing arm, or Issigonis-type suspension, the movement to be actuated is fairly complex. Firstly, the oscillation of the suspension in a vertical direction under load is taken care of partly by the tilting of the trailer vehicle about its road wheels, and partly by rotation of the two tubes 3 and 5 about their common axis. This will account for symmetrical and one-sided oscillation of the suspension. Further, oscillation of a trailing-arm-type suspension also causes a component of movement parallel to the longitudinal axis of the towing vehicle. In the case of a normal trailer hitch, with rigid towing connection, this can set up a violent longitudinal hammering between the trailer and the towing vehicle, and it is for this reason that in practice, a shock absorber is connected to damp the relative longitudinal movement of the two members 3 and 5. During towing, the rigid cylindrical sleeve 8 takes the load of the trailer to give a straight-through connection between the trailer and the towing vehicle. However, the oscillation referred to is still damped by the shock absorber. On braking of the towing vehicle, the trailer will begin to overrun the latter, and the tubes 3 and 5 will start to telescope together under the damping effect of the shock absorber. This movement is of the order of 3 inches, and is utilized to operate an overrun braking system of conventional type. In addition, to take account of the differential movement of the rear wheels of a vehicle equipped with Issigonis-type suspension as one wheel rides above the other, a certain amount of rotation of the bearing plates will also take place about the longitudinal axis of the spindles 32.

In some instances, it is found desirable to damp the rotational movement of the parts of the hitch about the pivot bolt 13, and this may be readily achieved by inserting plates of friction material between the lugs 12 and the plates 15. The degree of tightening of the bolt 13 will then provide a corresponding amount of friction damping.

It will be seen that the illustrated embodiment enables a trailer to be towed by any towing vehicle, without the provision of a permanent towing bracket. Also, the hitch can be rapidly detached form the towing vehicle by uncoupling the stub axles from the clamps 33, without removing the bearing plates 48 from the towing vehicle.

We claim:
1. A trailer hitch comprising a symmetrical substantially "Y"-shaped frame having parallel terminal arm portions carrying bearings for attachment to the rear wheel hubs of a towing vehicle, the foot of the "Y" being arranged for attachment to a trailer,
   a pivotal connection between the arms and foot of the "Y" which permits rotation of the arms of the "Y" as a unit relative to the foot, about an axis parallel to the foot and about an axis passing through the junction of the arms normal to the frame, and
   a pivotal connection between the terminal portions of each arm and the bearing carried thereby which permits rotation of each bearing arcuately about the longitudinal axis of the corresponding terminal arm portion.
2. A trailer hitch as claimed in claim 1 in which the foot portion of the arm consists of a pair of telescopically arranged tubular members the outermost of which is adapted to be secured to the trailer, and which provide a straight-through connection between the trailer and a vehicle to which it is attached when said tubular members are in their fully extended position.
3. A trailer hitch according to claim 2 comprising a shock absorber coupled to the two tubular members thereby damping their relative telescoping movement.
4. A trailer hitch according to claim 3 comprising overrun braking means on the trailer connected to said tubular members for actuating by telescoping movement of said tubular members.
5. A trailer hitch according to claim 1 wherein each bearing includes a slotted plate adapted for attachment to the hub of the corresponding rear wheel of a towing vehicle by means of the normal securing members of the latter.
6. Trailer hitch as claimed in claim 1 in which the terminal portion of each arm of the "Y" is hollow, and comprising a bearing-engaging clamp for each arm, which clamp includes a rod engaging in the hollow end of the arm, and means securing said rod in said clamp in a manner which prevents axial movement but allows sufficient rotational movement to permit operational arcuate rotation of the bearing around the axis of the terminal portion of the arm.

7. A trailer hitch as claimed in claim 1 comprising friction pads between the relatively moving parts of the arms of the "Y" and the foot, which pads damp the movement of the arms of the "Y" as a unit relative to the foot, about an axis passing through the junction of the arms normal to the frame.

8. A trailer hitch as claimed in claim 1 in which the arms of said "Y" diverge from each other at an obtuse angle and terminate in portions extending parallel to each other.

9. A trailer hitch according to claim 8 wherein said inclined portions are longitudinally adjustable.

10. A trailer hitch according to claim 9 wherein said parallel portions of said arms are longitudinally adjustable.

11. A trailer hitch according to claim 8 wherein said terminal end portions of the arms are cranked.